United States Patent Office 3,130,212
Patented Apr. 21, 1964

3,130,212
Δ$^{1,3,5(10),9(11)}$ PREGNATETRAENE-3,20-DIONES AND PROCESS FOR THE PRODUCTION THEREOF
Joseph Elks, London, John Francis Oughton, Buckingham, and Leslie Stephenson, London, England, assignors to Glaxco Group Limited, Greenford, England, a company of Great Britain
No Drawing. Filed Oct. 8, 1959, Ser. No. 845,074
Claims priority, application Great Britain Oct. 13, 1958
11 Claims. (Cl. 260—397.45)

This invention is concerned with the preparation of steroid derivatives of a new general type.

We have found that steroid Δ$^{1,4}$-3,11-diketones may be reacted with a carboxylic acid anhydride in the presence of a strong acid catalyst to yield new steroid compounds having an aromatic ring A, a methyl group in the 1-position and an acyloxy group in the 3-position. Depending on whether mild or forcing conditions are used, products with different characteristics in ring C may be obtained.

Thus, under mild conditions, i.e. low concentrations of strong acid catalyst and/or short reaction times and/or comparatively low reaction temperatures, the product is a 1-methyl-3-acyloxy-Δ$^{1,3,5(10)}$-steroid-11-ketone, having a 9α-hydrogen atom.

On the other hand, under forcing conditions, i.e. higher concentrations of strong acid catalyst and/or longer reaction times, the product is a 1-methyl-3,11-acyloxy-Δ$^{1,3,5(10),9(11)}$-steroid.

According to the invention, therefore, we provide a process for the production of new steroid derivatives having an aromatic ring A, a methyl group in the 1-position and an acyloxy group in the 3-position, in which a steroid Δ$^{1,4}$-3,11-diketone is reacted with a carboxylic acid anhydride in the presence of a strong acid catalyst.

The process according to the invention is carried out under essentially anhydrous conditions in view of the presence of the anhydride. It will be understood that in some cases the acid added may for convenience be in a form containing some water, which latter will however react with the anhydride rendering the actual conditions of reaction essentially anhydrous.

Suitable starting materials for use in the process according to the invention are for example compounds of the general formula:

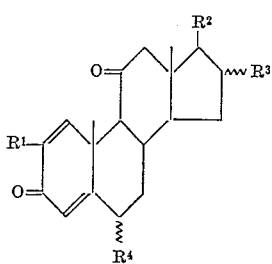

I (in which
R$^1$ is a hydrogen atom or an alkyl group;
R$^2$ is a hydrogen atom, a hydroxy or acyloxy group, a ketonic oxygen atom, an acetyl group, a hydroxy- or acyloxy-acetyl group, or a dihydroxy-acetone chain or a mono- or di-ester thereof, keto groups in said group R$^2$ being if necessary protected by formation of suitable derivatives thereof, e.g. semicarbazone formation, formation of a bis-methylenedioxy derivative (in the case of dihydroxy acetone side chains);
R$^3$ is a hydrogen atom or a hydroxy or alkyl group;
R$^4$ is a hydrogen or fluorine atom, or an alkyl group;)

Under mild conditions a compound of general Formula I is converted in accordance with the invention into a compound having the general formula

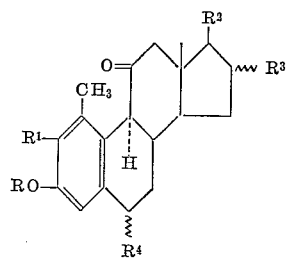

II (in which R$^1$, R$^2$, R$^3$, and R$^4$ have the above-stated meanings and R is an acyl group). Compounds of general Formula II may, if desired, then be hydrolysed, for example, by means of an alkali metal alkoxide or hydroxide in the presence of an alcohol, e.g. methanolic sodium or potassium methoxide or sodium or potassium hydroxide in methanol, to yield a compound having a free hydroxyl group in the 3-position. It will be understood that if there are other acyloxy groups (e.g. a 21- or 17-acyloxy group) in the molecule, these may also be simultaneously hydrolysed. The resulting 3-hydroxy compound may, if desired, be re-acylated, e.g. with acetic anhydride and pyridine.

Under forcing conditions, a compound of general Formula I is converted by the process of the invention into a compound of the following general formula:

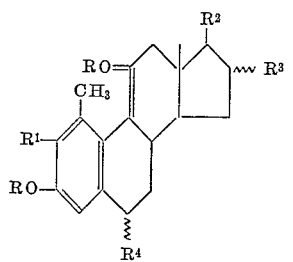

III in which R, R$^1$, R$^2$, R$^3$ and R$^4$ have the above-stated meanings. Compounds of general Formula II when treated in a similar manner (i.e. under forcing conditions) with a carboxylic acid anhydride in the presence of a strong acid catalyst will also yield compounds of general Formula III.

Compounds of general Formula III may then be hydrolysed, preferably by means of an alkali metal alkoxide or hydroxide in the presence of an alcohol, e.g. methanolic sodium or potassium methoxide or sodium or potassium hydroxide in methanol to yield compounds of the general formula:

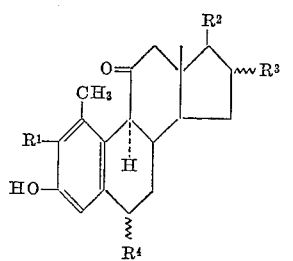

IV (in which R$^1$, R$^2$, R$^3$ and R$^4$ have the above-stated meanings), in which, it will be observed, the 9-hydrogen atom has the β-configuration. Compounds of general Formula IV may, if desired, then be acylated, e.g. with a mixture of acetic anhydride and pyridine, to yield 3-esters having an 11-keto group.

Compounds of Formula II, if desired after hydrolysis, may also be converted into compounds of Formula IV by treatment with a strong acid or (where alkali sensitive groupings are not present) with a strong alkali. In these processes, it should be noted that one usually obtains a mixture of 9α- and 9β-epimers in which the 9β-epimer predominates.

It is of interest to note that using the reaction conditions we employ with steroid 1,4-dienones not having an 11-keto group, one obtains 4-methyl-1-hydroxy type compounds having an aromatic A-ring, unless there is also a double bond at the 6,7-positions, when 1-methyl-3-hydroxy type compounds having an aromatic A-ring are obtained. It would appear, therefore, that in the process according to the invention the ketone group at $C_{11}$ is having the effect, not readily predictable, of controlling the re-arrangement to give the more useful 1-methyl-3-hydroxy derivative rather than the 4-methyl-1-hydroxy compound.

The carboxylic acid anhydride used in the conversion of compounds of Formula I to compounds of Formula II and Formula III may, for example, be the anhydride of a lower aliphatic acid, such as acetic anhydride, propionic anhydride, butyric anhydride, etc. Strong acid catalysts which may be used include, for example, sulphuric acid, perchloric acid and toluene-p-sulphonic acid. When using the first two of these acids, we have found it convenient to work at room temperature and, whilst p-toluene-sulphonic acid may also be used at room temperature, with this reagent we prefer to warm the reaction mixture for example to 70–100° C. In the processes herein described, wherein an acid anhydride is used, it should be noted that substituent hydroxy groups will usually be acylated. Reactive keto groups, e.g. a 17-keto group, may also be enol-acylated.

As stated above, in order to obtain compounds of Formula II from compounds of Formula I, mild conditions are used, whilst to obtain compounds of Formula III form compounds of Formula I forcing conditions are necessary. The progress of the reaction can conveniently be followed by withdrawing samples, isolating the crude product and examining its ultra-violet spectrum. The conversion of compounds of Formula I into compounds of Formula II is accompanied by the disappearance of the absorption maximum in the region of 240 mµ; the further reaction of II to yield III is accompanied by the reappearance of an absorption maximum in the region of 240 mµ. Corresponding changes also occur in the infra-red spectra. Frequently, the reaction will lead to a mixture of compounds of Formulae II and III but the mixture may readily be separated by chromatography, the compound of Formula III being the more readily eluted.

As examples of the effect of the reaction conditions upon the nature of the products, reaction of prednisone acetate (as an example of a compound of Formula I) with acetic anhydride containing 0.6% (w./v.) sulphuric acid for 4 hours at room temperature gave a product which proved to be substantially 3,17α,21-triacetoxy - 1 - methyl - 19 - norpregna - 1,3,5(10) - triene-11,20-dione (A) (i.e. a compound of Formula II); acetic anhydride containing 1.33% (w./v.) of $H_2SO_4$ for 5½ hours at room temperature gave a product containing some 75% by weight of 3,11,17α,21-tetra-acetoxy-1-methyl - 19 - nor - pregna - 1,3,5(10),9(11) - tetra - en-20-one (B) (i.e. a compound of Formula III, whilst acetic anhydride containing 2.12% (w./v.) of $H_2SO_4$ for 23 hours at room temperature gave the tetra-acetoxy compound (B) virtually free of the triacetoxy compound (A).

Again, treatment of prednisone acetate with acetic anhydride containing 0.096% (w./v.) perchloric acid for 8 hours at room temperature gave a product which appeared to consist of (A) with very little (B); the same acid concentration with a reaction time of 24 hours led to a product whose spectrum suggested that it was substantially (B).

With these observations in mind, it will be seen that one can readily ascertain the conditions to be employed to obtain either compounds of Formula II or compounds of Formula III from compounds of Formula I. It should be appreciated that in preparing compounds of Formula III from compounds of Formula I, it is not necessary to isolate compounds of Formula II.

The hydrolysis of compounds of Formula II to the corresponding free hydroxy compounds and of compounds of Formula III to compounds of Formula IV is conveniently achieved using methanolic sodium methoxide or potassium hydroxide in methanol, e.g. in the proportion of about one equivalent of base for each acyloxy group. It is doubtful whether this should be exceeded where alkali-sensitive groups are present although a lower amount is satisfactory since the base acts as catalyst for the transfer of acylate from the steroid to the methanol. Thus, in the hydrolysis of 3,17α,21-triacetoxy - 1 - methyl - 19 - norpregna - 1,3,5(10)- triene-11,20-dione, we have found that 1 to 3 equivalents of alkali can be used, and have obtained the best results with 2 equivalents. In these hydrolyses care should be taken to avoid the use of conditions sufficient to cause undesired equilbration at $C_9$.

The products of the process according to the invention are new, and therefore as a further feature of the invention we provide, as new compounds, compounds having the general formula:

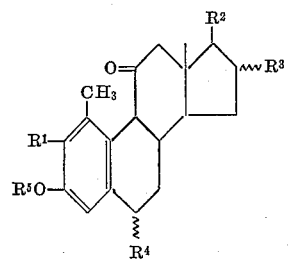

V where $R^1$ is a hydrogen atom or an alkyl group;
$R^2$ is a hydrogen atom, a hydroxy or acyloxy group, a ketonic oxygen atom, an acetyl group, a hydroxy- or acyloxy-acetyl group, a dihydroxy-acetone chain or a mono- or di-ester thereof,
$R^3$ is a hydrogen atom or a hydroxy or alkyl group,
$R^4$ is a hydrogen or fluorine atom or an alkyl group, and
$R^5$ is a hydrogen atom or an acyl group, the 9-hydrogen atom having the α- or β-configuration.

Particularly interesting compounds according to the invention are those having a 9β-hydrogen atom. Such compounds are more stable than the corresponding 9α-compounds. This is in clear distinction to steroids without an aromatic structure in ring A, in which case the 9α-compounds are very much more stable than the 9β-epimers. Important 9β-compounds according to the invention are 3,17α,21 - trihydroxy - 1 - methyl-19-nor-9β-pregna-1,3,5(10)-triene - 11,20 - dione, and 3-hydroxy-1-methyl-9β-oestra - 1,3,5(10) - triene - 11,17 - dione. The 3,21-diacetate of the first compound has the following characteristics:

M.P. 187–189° C.
$[\alpha]_D + 121°$ (c. 0.7 in $CHCl_3$)

It should be appreciated that these characteristics and others mentioned in this specification were measured using the purest materials hitherto available and are subject to variation dependent upon the purity of a given sample.

Notwithstanding the importance of the 9β-compounds according to the invention, the 9α-compounds are also important intermediates for synthetic purposes. Important 9α-compounds are the epimers of the 9β-compounds described above, i.e. (a) 3,17α,21-trihydroxy-1-methyl-19-nor-pregna-1,3,5(10)-triene-11,20-dione, which has the following characteristics:

M.P. 228–231° C.
$[\alpha]_D + 282°$ (c., 1 in acetone)
$\lambda_{max}$ 278–285 m$\mu$;

$$E_{1\ cm.}^{1\%} = 43.7$$

whilst its 3,21-diacetate has M.P. 235–236° C. and $[\alpha]_D + 268°$ (c., 1.0 in $CHCl_3$) and its 3,17,21-triacetate has M.P. 198–200° C. and $[\alpha]_D + 177°$ (c., 1.0 in $CHCl_3$), and (b) 3-hydroxy-1-methyloestra-1,3,5(10)-triene-11,17-dione, which has the following characteristics:

M.P. 230–233° C.
$[\alpha]_D + 426°$ (acetone)

whilst its 3-acetate has M.P. 203–208° C. and $[\alpha]_D + 375°$ (chloroform).

The new compounds according to the invention form a new class of compound which opens up a convenient route to the synthesis of various compounds of physiological interest, in particular new analogues of adrenocortical steroids. At the present time, increasing research is conducted to find new steroids of physiological and therapeutic value and, for this purpose, many analogues of known physiologically active compounds are being prepared; thus, the provision of new intermediates which enable new types of steroids of interest in physiological research to be prepared is important. In particular, the new compounds according to the invention are useful intermediates for the production of 1-methyl-19-nor compounds, which, having regard to their close relationship to cortisone, are of considerable interest.

It is also of note that compounds of Formula IV above where $R^2$ is a cortical side-chain have anticortisone activity.

In order that the invention may be well understood, the following examples are given by way of illustration only:

EXAMPLE 1

*3,17α,21-Triacetoxy-1-Methyl-19-Nor-Pregna-1,3,5(10)-Triene-11,20-Dione*

Pregnisone acetate (6.0 g.) was dissolved in warm acetic anhydride (150 ml.), the solution was cooled to room temperature and a solution of perchloric acid in acetic anhydride (15 ml.) (prepared by the cautious addition of 60% aqueous perchloric acid (1.25 ml.) to acetic anhydride (100 ml.) with ice cooling) was added. After 5 hours at room temperature, the solution was poured into an excess of aqueous sodium bicarbonate solution and extracted with ethyl acetate. The extract was washed with water, dried ($MgSO_4$) and evaporated to dryness under reduced pressure. The residue was dissolved in benzene and chromatographed on magnesium trisilicate (300 g.). Elution with benzene containing 3% of ethyl acetate gave a small quantity of material with a maximum at 242 m$\mu$. Benzene containing 5–20% of ethyl acetate then eluted 3,17α,21-triacetoxy-1-methyl-19-nor-pregna-1,3,5(10)-triene-11,20-dione, which was crystallised from ethanol to give material (3.1 g.; 43%), M.P. 200–201° C. $[\alpha]_D + 183°$ (c., 1.0 in $CHCl_3$). An analytical specimen had M.P. 198–200° C., $[\alpha]_D + 177°$ (c., 1.0 in $CHCl_3$).

Found: C, 66.85; H, 6.55; $CH_3CO$, 24.1. $C_{27}H_{32}O_8$ requires C, 66.9; H, 6.7; $CH_3CO$, 26.6%.

EXAMPLE 2

*3,17α,21-Trihydroxy-1-Methyl-19-Nor-Pregna-1,3,5(10)-Triene-11,20-Dione*

A solution of 3,17α,21 - triacetoxy - 1 - methyl-19-nor-pregna-1,3,5(10)-triene-11,20-dione (2.0 g.) in dry methanol (75 ml.) was treated with methanolic sodium methoxide (2.1 N; 5.9 ml.) and the solution was left at room temperature for 5 minutes. Water (0.3 ml.) was added and after another 5 minutes, water (30 ml.) and acetic acid (4.5 ml.) were added successively. The solution was evaporated to small bulk under reduced pressure and the residue was extracted with ethyl acetate. The extract was washed with water, dried ($MgSO_4$) and evaporated to dryness under reduced pressure. Crystallisation of the residue from ethyl acetate with charcoal gave 3,17α,21-trihydroxy-1-methyl-19-nor - pregna - 1,3,5(10) - triene-11,20-dione (0.5 g.; 34%), M.P. 235–236° C., $[\alpha]_D + 272°$ (c., 0.9 in dioxan).

EXAMPLE 3

*3,21-Diacetoxy-17α-Hydroxy-1-Methyl-19-Nor-Pregna-1,3,5(10)-Triene-11,20-Dione*

3,17α,21 - trihydroxy - 1 - methyl - 19-nor-pregna-1,3,5(10)-triene-11,20-dione (0.35 g.) was treated with acetic anhydride (2 ml.) and pyridine (4 ml.) and left overnight at room temperature. The solution was poured into water and extracted with ethyl acetate. The extract was washed with 2 N hydrochloric acid, aqueous sodium bicarbonate and water, dried ($MgSO_4$) and evaporated to dryness under reduced pressure. Crystallisation from ethyl acetate with charcoal gave the diacetate (0.25 g., 58%), M.P. 235–236° C., $[\alpha]_D + 268°$ (c., 1.0 in $CHCl_3$).

Found: C, 67.7; H, 6.7; CHCO, 19.9. $C_{25}H_{30}O_7$ requires C, 67.85; H, 6.8; $CH_3CO$, 19.4%.

EXAMPLE 4

*3,11,17α,21-Tetra-Acetoxy-1-Methyl-19-Nor-Pregna-1,3,5(10),9(11)-Tetra-En-20-One*

A solution of prednisone acetate (1.5 g.) in warm acetic anhydride (40 ml.) was cooled to room temperature and a solution of concentrated sulphuric acid (0.1 ml.) in acetic anhydride (3 ml.) was added. The solution was left at room temperature for 2 hours and a further quantity of concentrated sulphuric acid (0.2 ml.) in acetic anhydride (3 ml.) was added. The solution was allowed to stand for an additional 16 hours and was then poured into aqueous sodium bicarbonate solution. The mixture was extracted with ethyl acetate, the extract was washed with water, dried ($MgSO_4$) and evaporated to dryness under reduced pressure. The residue, in benzene, was chromatographed on alumina (acid washed; 70 g.). Benzene eluted 0.90 g. of 3,11,17α,21-tetra - acetoxy - 1 - methyl - 19 - nor - pregna - 1,3,5(10), 9(11)-tetra-en-20-one as a gum which could not be crystallized. $\lambda_{max.}$ 242 m$\mu$, $$E_{1\ cm.}^{1\%} = 248$$

Found: $CH_3CO$, 33.3. $C_{29}H_{34}O_9$ requires $CH_3CO$, 32.8%.

EXAMPLE 5

*3,21-Diacetoxy-17α-Hydroxy-1-Methyl-19-Nor-9β-Pregna-1,3,5(10)-Triene-11,20-Dione*

The tetra-acetate prepared as in Example 4 (4.75 g.) was dissolved in dry methanol (160 ml.). A current of nitrogen was blown through the solution and methanolic sodium methoxide (2.44 N, 14.9 ml.) was added. After 4 minutes, water (0.6 ml.) was added and after a further 5 minutes water (60 ml.) and acetic acid (10 ml.) were added. Most of the methanol was removed under reduced pressure. The residue was diluted with water and the mixture was extracted with ethyl acetate. The extract was washed with sodium bicarbonate and water, dried (MgSO$_4$) and evaporated under reduced pressure. The residue was dissolved in pyridine (20 ml.) and acetic anhydride (20 ml.) and left overnight at room temperature. The solution was poured onto ice and extracted with methylene chloride. The extract was washed with 2 N hydrochloric acid, aqueous sodium bicarbonate and water, dried (MgSO$_4$) and evaporated. Trituration of the residue with ethanol gave a crystalline solid (1.34 g.), M.P. 187–189° C., $[\alpha]_D +122°$ (c., 1.0 in CHCl$_3$). Crystallisation from ethyl acetate-hexane gave a pure sample of 3,21-diacetoxy-17α-hydroxy - 1 - methyl - 19 - nor - 9β - pregna - 1,3,5(10)-triene-11,20-dione, M.P. 187–189° C., $[\alpha]_D +121°$ (c., 0.7 in CHCl$_3$).

Found: C, 67.7; H, 7.0. C$_{25}$H$_{30}$O$_7$ requires C, 67.85; H, 6.8%.

The ethanol filtrate from the above compound deposited crystals (0.32 g.) on standing. These had M.P. 232–235° C., $[\alpha]_D +268°$ (c., 1.03 in CHCl$_3$) and consisted of 3,21 - diacetoxy - 17α - hydroxy - 1 - methyl - 19-nor-pregna-1,3,5(10)-triene-11,20-dione.

EXAMPLE 6

3,21-Diacetoxy-17α-Hydroxy-1-Methyl-19-Nor-9β-Pregna-1,3,5(10)-Triene-11,20-Dione A mixture of prednisone acetate (2 g.), acetic anhydride (25 ml.) and toluene-p-sulphonic acid (0.5 g.) was heated at 100° C. for 4 hours. After cooling, the solution was poured into excess aqueous sodium bicarbonate and extracted with ethyl acetate. The extract was washed with water, dried and evaporated under reduced pressure. The residue was hydrolysed with sodium methoxide and the hydrolysis product reacetylated as in Example 5. Purification of the product by chromatography on magnesium trisilicate (100 g.) gave 3,21-diacetoxy - 17α - hydroxy - 1 - methyl - 19 - nor - 9β-pregna-1,3,5(10)-triene-11,20-dione (0.72 g., 33%), M.P. 180–184° C.

EXAMPLE 7

3,17α,21-Triacetoxy-1-Methyl-19-Nor-Pregna-1,3,5(10)-Triene-11,20-Dione

Aqueous perchloric acid (60%; 0.15 ml.) was added carefully to acetic anhydride (10 ml.) of 0° C. and this solution was added to a stirred suspension of prednisone acetate (10 g.) in acetic anhydride (290 ml.). A clear solution was obtained after 90 mins. at room temperature and the solution was then kept for a further 3 hrs. 45 min. at room temperature. The solution was added carefully to an excess of aqueous sodium bicarbonate and extracted with ethyl acetate. The extract was washed with water, dried (MgSO$_4$) and evaporated to dryness. The residue, dissolved in benzene, was chromatographed on magnesium trisilicate (140 g.). Benzene and benzene-ethyl acetate eluted the triacetate which, after crystallisation from ethanol, was obtained in 60% yield; M.P. 199–201° C. $[\alpha]_D +177.5°$ (CHCl$_3$).

EXAMPLE 8

3,17α,21-Trihydroxy-1-Methyl-19-Nor-Pregna-1,3,5(10)-Triene-11,20-Dione 3,17α,21 - triacetoxy - 1 - methyl - 19 - nor - pregna-1,3,5(10)-triene-11,20-dione (2.0 g.) in methanol (200 ml.) was treated with a 2% solution of potassium hydroxide in methanol (23.2 ml.). The solution was left at room temperature under nitrogen for 30 minutes and acetic acid was added to neutralise the alkali. Water was added and the methanol removed by distillation under reduced pressure. The residue was left overnight in the refrigerator and filtered. Crystallisation from 50% aqueous methanol gave, in 3 crops, 1.0 g. (68%) of the triol, M.P. 229.5–232° C., $[\alpha]_D +282°$ (acetone). A sample recrystallised from ethyl acetate had M.P. 228–231° C., $[\alpha]_D +282°$ (acetone). (Found: C, 70.3; H, 7.6. C$_{21}$H$_{26}$O$_5$ requires C, 70.4; H, 7.3%.)

EXAMPLE 9

Epimerisation of 3,21-Diacetoxy-17α-Hydroxy-1-Methyl-19-Nor-Pregna-1,3,5(10)-Triene-11,20-Dione The steroid (0.5 g.) in acetic acid (75 ml.) was treated with perchloric acid (60%: 3.75 ml.). The specific rotation dropped from +243° to +163° in 26 hours and then remained almost constant. After 42 hours the solution was poured into water and extracted with ethyl acetate. The extract was washed with sodium bicarbonate and water, dried (MgSO$_4$) and evaporated to dryness. The residual gum (0.555 g.) was treated overnight at room temperature with acetic anhydride (5 ml.) and pyridine (5 ml.). The mixture was poured onto ice, to give a gum which slowly solidified. This was filtered off, washed thoroughly with water, and dried; 0.50 g., $[\alpha]_D +132°$, (c., 1.12 in CHCl$_3$).

This material (0.42 g.), in benzene, was chromatographed on magnesium trisilicate (2.5 g.). Benzene containing 10% to 15% of ethyl acetate eluted 205 mg. of material with M.P. varying from 182–205° C. to 204–220° C. Crystallisation of the combined crystalline fractions gave a first crop of prisms (28 mg.), M.P. 225–233° C. $[\alpha]_D +269°$ (C., 0.9 in CHCl$_3$), which was substantially the starting 9α-compound. A second crop consisted of a mixture of prisms and rosettes, which were separated as completely as possible by virtue of their different densities. The prisms (10.5 mg.), M.P. 230–239° C., $[\alpha]_D +267°$ (c., 0.66 in CHCl$_3$) again consisted of the 9α-epimer. The needles (62 mg.), M.P. 185–206° C., $[\alpha]_D +162°$ (c., 0.91 in CHCl$_3$), consisted mostly of the 9β-epimer, 3,21-diacetoxy-17α-hydroxy-1-methyl-19-nor-9β-pregna-1,3,5(10)-triene-11,20-dione.

EXAMPLE 10

3-Acetoxy-1-Methyloestra-1,3,5(10)-Triene-11,17-Dione

Androsta-1,4-diene-3,11,17-trione (10.0 g.) was dissolved in warm acetic anhydride (280 ml.). The solution was cooled to room temperature and treated with a solution which had been prepared by the cautious addition at 0° C., of 60% perchloric acid (0.3 ml.) to acetic anhydride (20 ml.). The solution was shaken for a few minutes, when it became clear and was then left at room temperature for 6 hours. It was then added to an excess of saturated sodium bicarbonate solution and extracted with ethyl acetate. The extract was washed with water, dried (MgSO$_4$) and evaporated to dryness. The residue was chromatographed on magnesium trisilicate (100 g.). Benzene and ethyl acetate in benzene eluted 9.84 g. of material which yielded, on crystallisation from methanol, 3-acetoxy - 1 - methyloestra-1,3,5(10)-triene-11,17-dione (7.86 g., 69%), M.P. 197–200° C., $[\alpha]_D +375°$ (CHCl$_3$). Recrystallisation from methanol gave the analytical specimen with M.P. 203–208° C., $[\alpha]_D +375°$ (CHCl$_3$). (Found: C, 74.3; H, 7.3. C$_{21}$H$_{24}$O$_4$ requires C, 74.1; H, 7.1%).

EXAMPLE 11

3-Hydroxy-1-Methyloestra-1,3,5(10)-Triene-11,17-Dione

3 - acetoxy-1-methyloestra-1,3,5(10)-triene-11,17-dione (4.0 g.) in methanol (300 ml.) was treated with a solution of potassium hydroxide (1 g.) in methanol (20 ml.) and the mixture was stirred under nitrogen for 1 hour. Acetic acid was added to neutralise the excess alkali and the methanol was distilled off under reduced pressure. The residue was left overnight in the refrigerator and the solid (3.2 g., M.P. 231–235° C.) was then filtered off, dried and crystallised from methanol. The 3-hydroxy-1-methyloestra-1,3,5(10)-triene-11,17-dione (2.54 g. 75%) melted at 230–233° C., and had $[\alpha]_D +429°$ (acetone). After further crystallisation from methanol, the material had M.P. 230–233° C. and $[\alpha]_D+426°$ (acetone). (Found: C, 76.5; H, 7.5. $C_{19}H_{22}O_3$ requires C, 76.5; H, 7.4%.)

EXAMPLE 12

*Epimerisation of 3-Acetoxy-1-Methyloestra-1,3,5(10)-Triene-11,17-Dione*

The steroid (100 mg.) in acetic acid (10 ml.) was treated with 60% perchloric acid (0.5 ml.) and the solution was stored at room temperature. The rotation, measured in a 1 dm. tube, dropped from $+3.46°$ to $+2.23°$ in 48 hours and then remained steady. The solution was poured into water, the mixture was extracted with ether, the extract washed with sodium bicarbonate solution, dried ($MgSO_4$) and evaporated. The residual gum was treated overnight at room temperature with pyridine (1 ml.) and acetic anhydride (1 ml.). Addition to ice and isolation with ether gave a gum (74 mg.), $[\alpha]_D+209°$ (c., 1 in $CHCl_3$). The rotation and infra-red spectrum were consistent with its being substantially 3-acetoxy-1-methyl-9β-oestra-1,3,5(10)-triene-11,17-dione.

EXAMPLE 13

*Epimerisation of 3-Hydroxy-1-Methyloestra-1,3,5(10)-Triene-11,17-Dione*

The steroid (250 mg.) was boiled under reflux for 1 hour in an atmosphere of nitrogen, with a 5% solution of potassium hydroxide in 95% ethanol (5 ml.). The cooled solution was diluted with water and acidified with concentrated hydrochloric acid. The precipitated solid was extracted with ether, the extract washed with aqueous sodium bicarbonate and water, dried ($MgSO_4$) and evaporated. The residue (215 mg.) appeared, from its IR spectrum to be substantially 3-hydroxy - 1 - methyl-9β-oestra-1,3,5(10)-triene-11,17-dione.

We claim:

1. 3,11,17α,21 - tetra-acetoxy-1-methyl-19-nor-pregna-1,3,5(10),9(11)-tetra-en-20-one.

2. A process for the production of a steroid compound selected from the group consisting of a steroid compound of the pregnane series and a steroid compound of the androstane series, said compound being unsubstituted at the 10-position but containing a methyl group at the 1-position, an acyloxy group at the 3-position and double bonds at 1-, 3- and 5(10)-positions, which process comprises reacting a steroid compound of one of said series with a carboxylic acid anhydride in the presence of a strong acid catalyst, said last-mentioned steroid compound being unsubstituted at the 1-position but containing a methyl group at the 10-position, keto groups at the 3- and 11-positions and double bonds at the 1- and 4-positions, stopping the reaction with the formation of a 1-methyl-3-acyloxy-$\Delta^{1,3,5(10)}$-steroid-11-ketone, having a 9α-hydrogen atom, and hydrolysing said last-mentioned steroid compound by means of an alkaline material selected from the group consisting of an alkali metal alkoxide and hydroxide in the presence of an alcohol to yield a free hydroxyl group in the 3-position.

3. A process as claimed in claim 2 in which the alcohol is methanol.

4. A process for the production of a steroid compound selected from the group consisting of a steroid compound of the pregnane series and a steroid compound of the androstane series, said compound being unsubstituted at the 10-position but containing a methyl group at the 1-position, an acyloxy group at the 3-position and double bonds at the 1-, 3- and 5(10)-positions, which process comprises reacting a steroid compound of one of said series with a carboxylic acid anhydride in the presence of a strong acid catalyst, said last-mentioned steroid compound being unsubstituted at the 1-position but containing a methyl group at the 10-position, keto groups at the 3- and 11-positions and double bonds at the 1- and 4-positions, stopping the reaction with the formation of a 1 - methyl-3-acyloxy-$\Delta^{1,3,5(10)}$-steroid-11-ketone, having a 9α-hydrogen atom, and treating said last-mentioned steroid compound with a material selected from the group consisting of a strong acid and a strong base to yield a compound having a free hydroxyl group at the 3-position and a β-hydrogen atom at the 9-position.

5. A process as claimed in claim 4 in which said material is perchloric acid.

6. A process as claimed in claim 4 in which said material is potassium hydroxide.

7. A process for the production of a steroid compound selected from the group consisting of a steroid compound of the pregnane series and a steroid compound of the androstane series, said compound being unsubstituted at the 10-position but containing a methyl group at the 1-position, an acyloxy group at the 3-position and double bonds at the 1-, 3- and 5(10)-positions, which process comprises reacting a steroid compound of one of said series with a carboxylic acid anhydride in the presence of a strong acid catalyst, said last-mentioned steroid compound being unsubstituted at the 1-position but containing a methyl group at the 10-position, keto groups at the 3- and 11-positions and double bonds at the 1- and 4-positions, said reaction being continued to the formation of a 1-methyl-3,11-diacyloxy-$\Delta^{1,3,5(10),9(11)}$-steroid.

8. A process as claimed in claim 7 including the additional step of hydrolysing said 1-methyl-3,11-diacyloxy-$\Delta^{1,3,5(10),9(11)}$-steroid to yield a 1 - methyl - 3 - hydroxy-$\Delta^{1,3,5(10)}$-steroid-11-ketone having a 9β-hydrogen atom.

9. A process as claimed in claim 8 in which the hydrolysis is effected by means of an alkaline material selected from the group consisting of an alkali metal alkoxide and hydroxide in the presence of an alcohol.

10. A process as claimed in claim 8 in which the alcohol is methanol.

11. A process as claimed in claim 2 in which the resulting 1-methyl-3-hydroxy-steroid-11-ketone having a 9α hydrogen atom is treated with a material selected from the group consisting of a strong acid and a strong base to reverse the configuration of the hydrogen atom in the 9-position from alpha to beta.

References Cited in the file of this patent

UNITED STATES PATENTS

| | | |
|---|---|---|
| 2,874,173 | Hogg et al. | Feb. 17, 1959 |
| 3,013,027 | Ruzicka et al. | Dec. 12, 1961 |
| 3,074,934 | Chemerda et al. | Jan. 22, 1963 |

OTHER REFERENCES

Dreiding et al.: J.A.C.S. 75, 3159–3161, July 5, 1953.

UNITED STATES PATENT OFFICE
CERTIFICATE OF CORRECTION

Patent No. 3,130,212          April 21, 1964

Joseph Elks et al.

It is hereby certified that error appears in the above numbered patent requiring correction and that the said Letters Patent should read as corrected below.

In the grant, lines 3 and 13, and in the heading to the printed specification, line 6, for "Glaxco Group Limited", each occurrence, read -- Glaxo Group Limited --.

Signed and sealed this 3rd day of November 1964.

(SEAL)
Attest:

ERNEST W. SWIDER
Attesting Officer

EDWARD J. BRENNER
Commissioner of Patents